US006853433B2

United States Patent
Kim et al.

(10) Patent No.: US 6,853,433 B2
(45) Date of Patent: Feb. 8, 2005

(54) LIQUID CRYSTAL DISPLAY DEVICE HAVING SODA-LIME GLASS AND METHOD OF FABRICATING THE SAME

(75) Inventors: Woong-Kwon Kim, Gyeonggi-do (KR); Seung-Ryul Park, Incheon (KR)

(73) Assignee: LG. Philips LCD Co., Ltd., Seoul (KR)

( * ) Notice: Subject to any disclaimer, the term of this patent is extended or adjusted under 35 U.S.C. 154(b) by 35 days.

(21) Appl. No.: 10/606,767

(22) Filed: Jun. 27, 2003

(65) Prior Publication Data

US 2004/0090588 A1 May 13, 2004

(30) Foreign Application Priority Data

Nov. 11, 2002 (KR) .................................. 10-2002-0069577

(51) Int. Cl.[7] .................................................. G02F 1/13
(52) U.S. Cl. ......................................... 349/158; 349/43
(58) Field of Search ..................... 349/43, 158; 257/59, 257/72

(56) References Cited

U.S. PATENT DOCUMENTS 5,583,369 A * 12/1996 Yamazaki et al. .......... 257/635

OTHER PUBLICATIONS

Materials and Assembling Process of LCDs by S. Morozumi, pp. 173–181, 1992.*

Mamoru Mizuhashi, et al. "Effect of silicon oxide coatings on the out-diffusion of alkali form soda-lime-silica glass". Reports Res. Lab. Asahi Glass Co., Ltd., 32 [2] (1982). pp. 79–86.

* cited by examiner

Primary Examiner—James A. Dudek
(74) Attorney, Agent, or Firm—Morgan Lewis & Bockius LLP

(57) ABSTRACT

A liquid crystal display device includes an upper substrate including a first soda lime glass material, an ion blocking layer on the first soda lime glass material, a color filter layer, and a common electrode, a lower substrate including a second soda lime glass material, a transparent organic insulator on the second soda lime glass material, and a thin film transistor on the transparent organic insulator, and a liquid crystal material layer interposed between the upper substrate and the lower substrate.

40 Claims, 12 Drawing Sheets

LIQUID CRYSTAL DISPLAY DEVICE HAVING SODA-LIME GLASS AND METHOD OF FABRICATING THE SAME

The present invention claims the benefit of the Korean Patent Application No. P2002-0069577 filed in Korea on Nov. 11, 2002, which is hereby incorporated by reference.

BACKGROUND OF THE INVENTION

1. Field of the Invention

The present invention relates to a liquid crystal display device, and more particularly to a liquid crystal display device having array and color filter substrates that include soda-lime glass and a method of fabricating a liquid crystal display device having array and color filter substrates that include soda-lime glass.

2. Discussion of the Related Art

Since flat panel display devices are thin, light weight, and have low power consumption, they have been used as displays for portable devices. Among the various types of flat panel display devices, liquid crystal display (LCD) devices have been commonly used for laptop computers and desktop computer monitors because of their superior resolution, display of color images, and high display quality.

LCD devices commonly make use of optical anisotropy and polarization properties of liquid crystal molecules, wherein specific alignment directions of the liquid crystal molecules may be changed by induced electric fields. Accordingly, incident light may be refracted according to the alignment direction of the liquid crystal molecules.

The LCD devices commonly include upper and lower substrates having electrodes that are spaced apart and face each other, and a liquid crystal material interposed between the upper and lower substrates. Accordingly, when an electric field is induced to the liquid crystal material through the electrodes of the upper and lower substrates, the alignment direction of the liquid crystal molecules changes to display image data (i.e. pictures). Light transmittances through the liquid crystal molecules may be controlled by changing the electric field to display the image data.

The LCD devices are commonly incorporated into office automation and video equipment because of their light weight, thin design, and low power consumption. Among the different types of LCD devices, active matrix LCD (AM-LCD) devices having thin film transistors and pixel electrodes arranged in a matrix configuration offer high resolution and superiority in displaying moving images. A typical LCD panel has an upper substrate, a lower substrate, and a liquid crystal material layer disposed therebetween. The upper substrate (i.e., a color filter substrate) includes a common electrode and color filters, and the lower substrate (i.e., an array substrate) includes switching elements, such as thin film transistors (TFT's), and pixel electrodes.

FIG. 1 is an expanded perspective view of a liquid crystal display device according to the related art. In FIG. 1, an LCD device 11 includes an upper substrate 5 and a lower substrate 10 having a liquid crystal material layer 9 disposed therebetween. A black matrix 6 and a color filter layer 7 are formed in an array matrix configuration on the upper substrate 5, wherein the color filter layer 7 includes a plurality of red (R), green (G), and blue (B) color filters surrounded by the black matrix 6. In addition, a common electrode 18 is formed on the upper substrate 5 to cover the color filter layer 7 and the black matrix 6.

A plurality of thin film transistors T are formed in an array matrix configuration on the lower substrate 10 that correspond to the color filter layer 7. A plurality of gate lines 14 and data lines 22 are positioned on the lower substrate 10 crossing each other to define a plurality of pixel regions P, wherein each TFT T is located within the pixel regions P adjacent to each intersection of the gate lines 14 and the data lines 22. In addition, a plurality of pixel electrodes 36 are formed within the pixel regions P, wherein the pixel electrodes 36 include a transparent conductive material having high transmissivity, such as indium-tin-oxide (ITO) or indium-zinc-oxide (IZO). Although not shown, the LCD device 11 includes a backlight device disposed under the lower substrate 10. The backlight device (not shown) irradiates light toward the lower and upper substrates 10 and 5.

In FIG. 1, a scanning signal is supplied to a gate electrode of the thin film transistor T through the gate line 14, and a data signal is supplied to a source electrode of the thin film transistor T through the data line 22. Accordingly, the liquid crystal molecules of the liquid crystal material layer 9 are aligned and arranged by operation of the thin film transistor T, and incident light from the backlight device (not shown) passing through the liquid crystal material layer 9 is controlled to display image data.

In the liquid crystal display device 11, the upper and lower substrates 5 and 10 are commonly formed of non-alkali substrate material. However, other types of glass materials are used as the substrates for the liquid crystal display device 11. For example, soda lime glass or borosilicate glass can be used to make the upper and lower substrates 5 and 10. Specifically, glass material used to make the upper and lower substrates 5 and 10 can be classified into non-alkali glass materials, soda lime glass materials, and borosilicate glass materials. The non-alkali glass materials have less than 0.1 wt % content of $Na_2O$, the soda lime glass materials have more than 1 wt % content of $Na_2O$, and the borosilicate glass materials have from 0.1 wt % to 1 wt % of $Na_2O$. Alternatively, the soda lime glass materials are commonly referred to as alkali glass.

The active matrix type liquid crystal display devices having a plurality of thin film transistors use non-alkali glass for making the lower and upper substrates. Since soda lime glass materials include significant amounts of alkali ions, the alkali ions are extracted from the soda lime glass substrates. Accordingly, the thin film transistors formed with soda lime glass substrates are adversely affected by the alkali ions diffusing from the soda lime glass. Thus, active channels of each thin film transistor are contaminated by the diffusion of the alkali ions. As a result, the semi-conductivity of the active channels is compromised and electric current freely flows through the active channels when the scanning signal is not supplied to the gate line. Thus, leakage currents $I_{off}$ of the thin film transistors increase. In addition, the liquid crystal material layer is contaminated by the diffusion of the alkali ions from the soda lime glass. Accordingly, an after-image effect (i.e., residual image effect) is created in the liquid crystal display device during operation. Thus, active matrix type liquid crystal display devices commonly use non-alkali glass materials for making the lower and upper substrates, since diffusion of alkali ions in non-alkali glass materials do not adversely effect performance of the thin film transistors or the liquid crystal material layer.

However, although LCD devices have a thin profile and are light weight as compared to cathode ray tubes (CRTs), LCD devices cost significantly more than CRTs due to higher productions costs for fabricating the LCD devices. Accordingly, reducing production costs of the LCD devices is important. In general, non-alkali glass materials are significantly more expensive than alkali glass materials. For example, the current cost of non-alkali glass materials is about three times higher than the current cost of soda lime glass materials. Thus, one way to reduce production costs of the LCD devices is to make active matrix type LCD devices on soda lime glass materials instead of non-alkali glass materials.

Generally, the glass material for making the array substrate, which includes the thin film transistors, is chosen from non-alkali material so that performance of the thin film transistors is not compromised due to the diffusion of the alkali ions. Conversely, the color filter substrate is formed of alkali glass material since diffusion of alkali ions through the color filter layers and black matrix is not significant. In addition, low temperature processes have to be utilized instead of high temperature processes in order to minimize and prevent damage due to the different coefficients of thermal expansion of the non-alkali glass material and the alkali glass material.

It has been suggested that a silicon oxide ($SiO_2$) layer be formed on substrates made of soda lime glass material to prevent diffusion of alkali ion diffusion since silicon oxide may block diffusion of the alkali ions. For example, the blocking effects of silicon oxide has been disclosed by Mamoru Mizuhashi and Yoshio Gotoh in "Effect of Silicon Oxide Coating on the Out-Diffusion of Alkali from Soda-Lime-Silicon Glass."

However, when the color filter substrate is formed of alkali glass material, the cost of production is still high and the difference between the coefficients of thermal expansion still exist between the alkali glass material of color filter substrate and the non-alkali glass material of the array substrate. This difference in the coefficients of thermal expansion may cause a rupture of a sealant formed between the alkali glass color filter substrate and the non-alkali glass array substrate. In addition, deposition of oxide silicon is performed at an optimum temperature ranging from 450 to 500° C. However, since temperatures of about 450–500° C. begin to approach the strain limit of soda lime glass material (i.e., about 510° C.), the soda lime glass will be strained and will become distorted. Although, a silicon oxide layer may be formed on soda lime glass at temperatures lower than 450 to 500° C., the resultant silicon oxide layer will not sufficiently blocking diffusion of the alkali ions from the soda lime glass.

SUMMARY OF THE INVENTION

Accordingly, the present invention is directed to an LCD device and a method of fabricating an LCD device that include soda lime glass material that substantially obviate one or more of problems due to limitations and disadvantages of the related art.

An object of the present invention is to provide an LCD device having reduced production costs.

Another object of the present invention is to provide a method of fabricating an LCD device that prevents diffusion of alkali ions from soda lime glass material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes an upper substrate including a first soda lime glass material, an ion blocking layer on the first soda lime glass material, a color filter layer, and a common electrode, a lower substrate including a second soda lime glass material, a transparent organic insulator on the second soda lime glass material, and a thin film transistor on the transparent organic insulator, and a liquid crystal material layer interposed between the upper substrate and the lower substrate.

In another aspect, a liquid crystal display device includes an upper substrate including a first soda lime glass material, a first transparent organic insulator, and a common electrode, a lower substrate including a second soda lime glass material, a second transparent organic insulator, a color filter layer, and a thin film transistor, and a liquid crystal material layer between the upper substrate and the lower substrate.

In another aspect, a method of forming a liquid crystal display device includes forming an upper substrate to include a first soda lime glass material, a black matrix, an ion blocking layer, a color filter layer, and a common electrode, forming a lower substrate including a second soda lime glass material, a transparent organic insulator on the soda lime glass, and a thin film transistor on the transparent organic insulator, attaching the upper substrate to the lower substrate such that the common electrode faces the thin film transistor, and forming a liquid crystal material layer between the upper substrate and the lower substrate.

In another aspect, a method of forming a liquid crystal display device includes forming an upper substrate to include a first soda lime glass material, a first transparent organic insulator, a black matrix, and a common electrode, forming a lower substrate to include a second soda lime glass material, a second transparent organic insulator, a color filter layer, and a thin film transistor, attaching the upper substrate to the lower substrate such that the common electrode faces the thin film transistor, and forming a liquid crystal material layer between the upper substrate and the lower substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
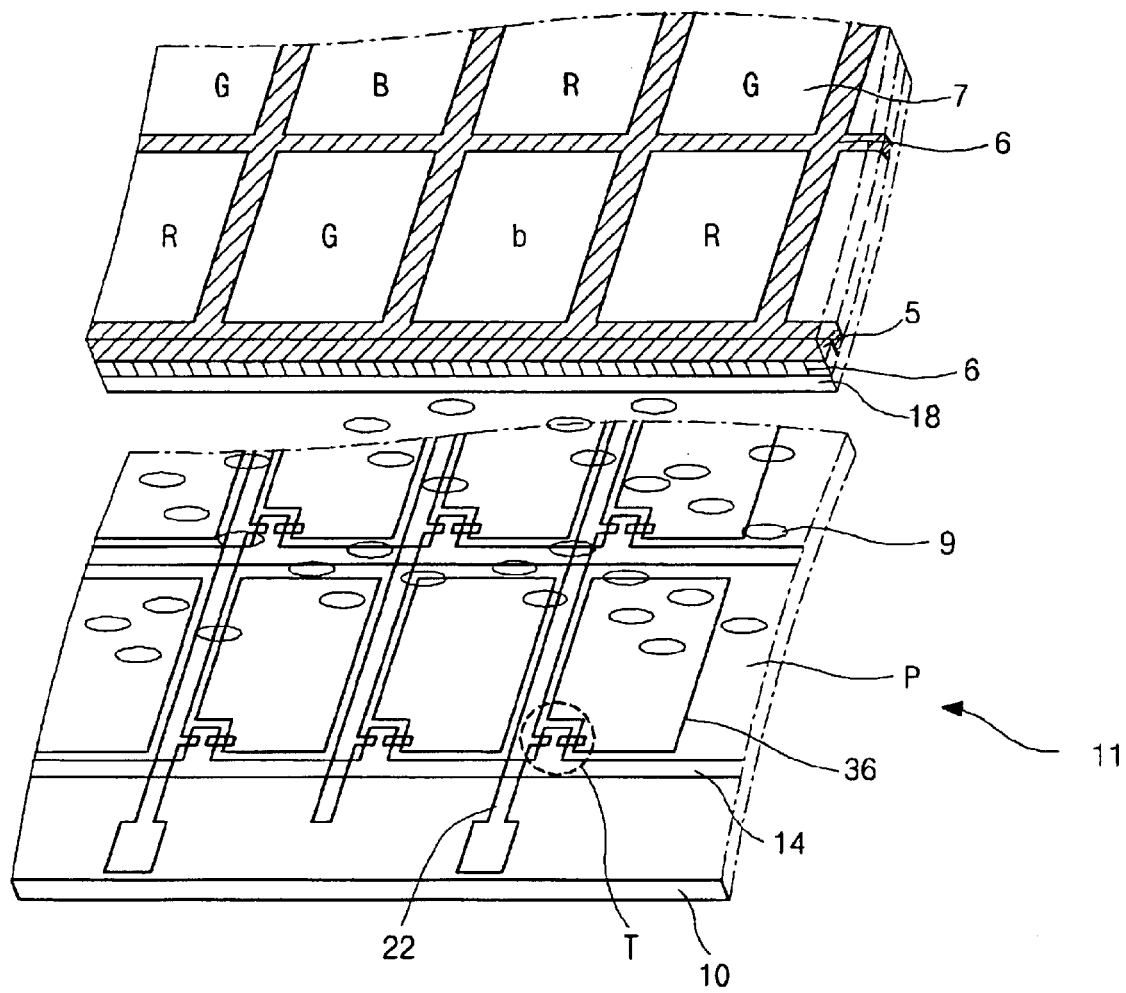
FIG. 1 is an expanded perspective view of a liquid crystal display device according to the related art.
Figure 2A:
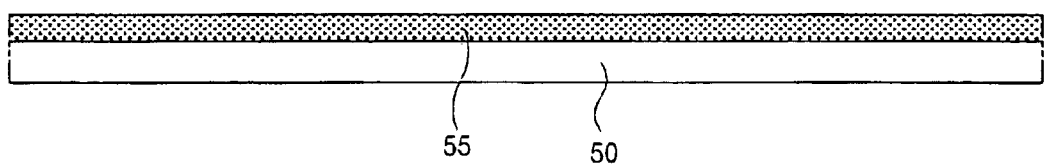
FIGS. 2A to 2E are cross sectional views of an exemplary method of fabricating a lower substrate of a liquid crystal display device according to the present invention.

FIGS. 2A to 2E are cross sectional views of an exemplary method of fabricating a lower substrate of a liquid crystal display device according to the present invention. In FIG. 2A, a transparent organic insulator 55 may be formed on a soda lime glass material 50. The transparent organic insulator 55 may include acrylate, polyimide, polylefin, benzocyclobutene (BCB), poly oxaxol, cardo epoxy, cardo acrylate, and combinations thereof. In addition, the transparent insulator 55 may include an inorganic material that includes more than two of acrylate, polyimide, polylefin, benzocyclobutene (BCB), poly oxaxol, cardo epoxy, and cardo acrylate, or may include silane. Alternatively, the transparent insulator 55 may include a hybrid co-polymer that includes more than one of acrylate, polyimide, polylefin, benzocyclobutene (BCB), poly oxaxol, cardo epoxy, and cardo acrylate and other organic materials.

Figure 2B:
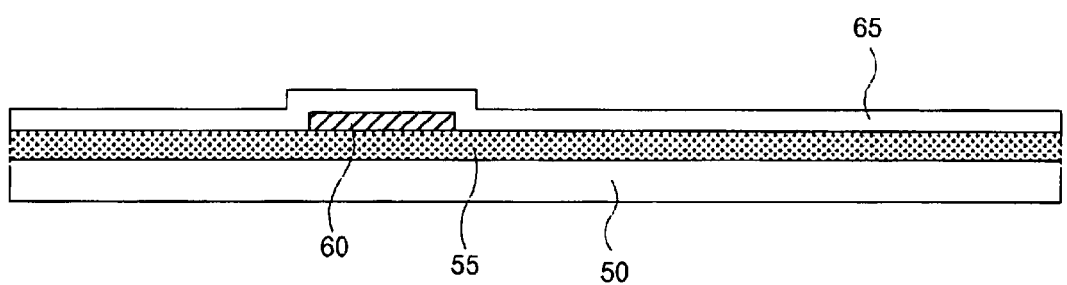

In FIG. 2B, a first metal layer may be deposited on the transparent organic insulator 55 and patterned to form a gate electrode 60 and a gate line (not show). The first metal layer may include aluminum or an aluminum alloy (i.e., AlNd). After patterning the first metal layer, a gate insulation layer 65 may be formed on the transparent organic insulator 55 to cover the gate electrode 60 and the gate line (not shown).

Figure 2C:
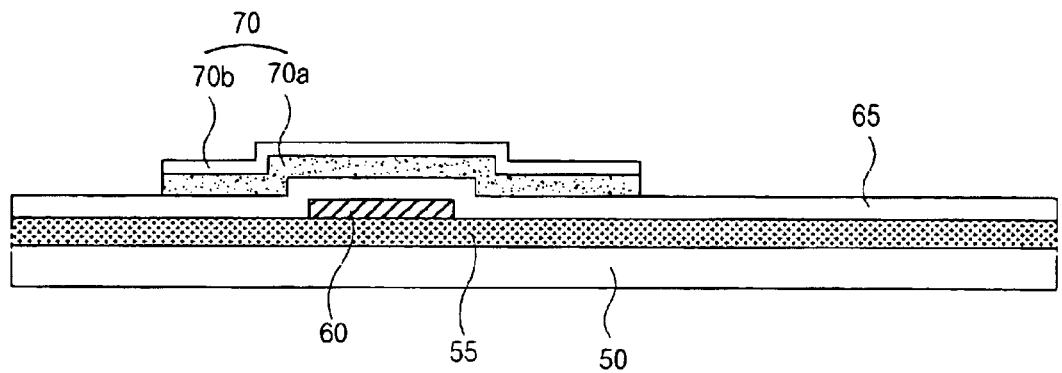

In FIG. 2C, an intrinsic amorphous silicon layer (a-Si:H) and a $p^+$-doped or $n^+$-doped amorphous silicon layer ($n^+/p^+$ a-Si:H) may be sequentially deposited on an entire surface of the gate insulation layer 65, and simultaneously patterned to form both an active layer 70a and an ohmic contact layer 70b on the gate insulation layer 65 over the gate electrode 60. Accordingly, the active layer 70a and the ohmic contact layer 70b may constitute a semiconductor layer 70, wherein the ohmic contact layer 70b may be located on the active layer 70a.

Figure 2D:
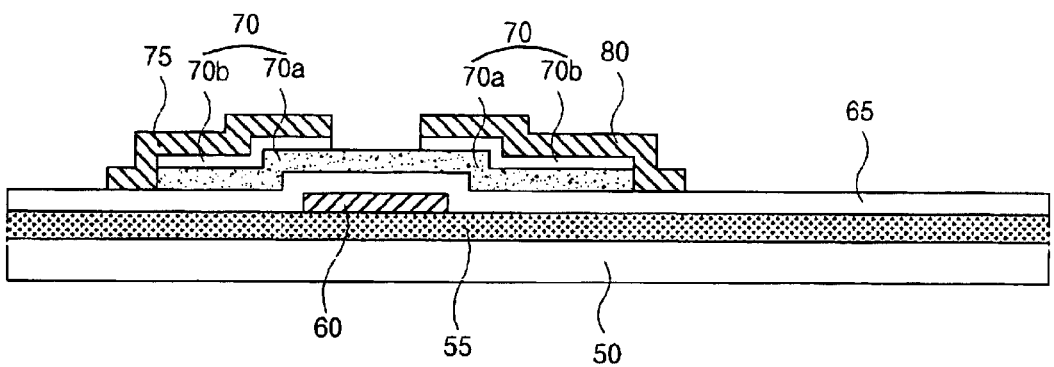

In FIG. 2D, a second metal layer may be formed over an entire surface of the soda lime glass material 50 to cover the active and ohmic contact layers 70a and 70b. Then, the third metal layer may be patterned to form a source electrode 75, a drain electrode 80, and a data line (not shown). Although now shown, the data line may perpendicularly cross the gate line to define a pixel region. The source electrode 75 may extend from the data line and the drain electrode 80 may be spaced apart from the source electrode 75 above the gate electrode 60. After patterning the third metal layer, a portion of the ohmic contact layer 70b between the source and drain electrodes 75 and 80 may be removed to expose an underlying portion of the active layer 70a to form a channel region of the thin film transistor. Accordingly, the thin film transistor includes the gate electrode 60, the semiconductor layer 70, and the source and drain electrodes 75 and 80.

Figure 2E:
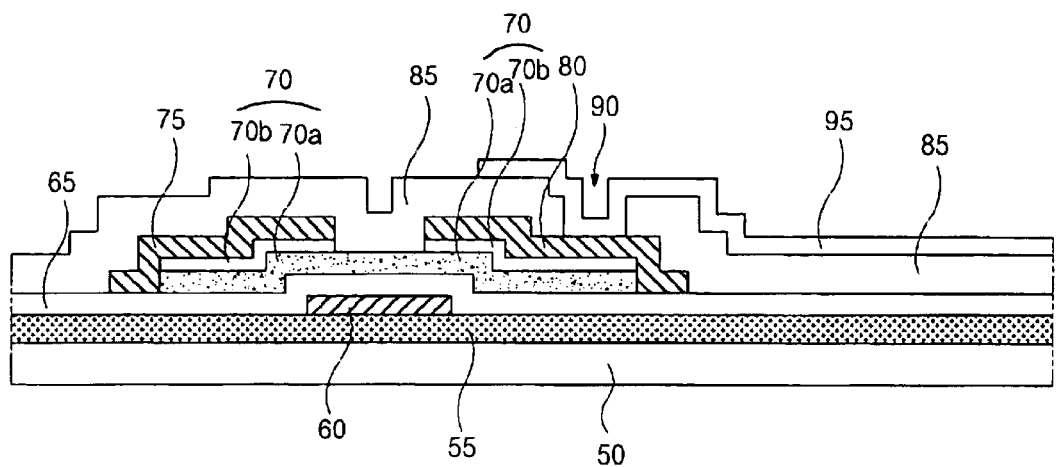

In FIG. 2E, a passivation layer 85 may be formed over an entire surface of the soda lime glass material 50 to cover the patterned second metal layer to protect the data line (not show), the source electrode 75, and the drain electrode 80. The passivation layer 85 may be formed of an inorganic material, such as silicon nitride ($SiN_X$) or silicon oxide ($SiO_2$), or may be formed of an organic material, such as benzocyclobutene (BCB) or an acrylic resin. Then, the passivation layer 85 may be patterned to form a drain contact hole 90 that exposes a portion of the drain electrode 80. Next, a transparent conductive material, such as indium tin oxide (ITO) or indium zinc oxide (IZO), may be deposited on the passivation layer 85 and patterned to form a pixel electrode 95 within the pixel region, wherein the pixel electrode 95 contacts the drain electrode 80 through the drain contact hole 90.

According to the present invention, the lower substrate (i.e., the array substrate) is made of the soda lime glass material, and the transparent organic layer may be used to prevent alkali ion diffusion from the soda lime glass material to the thin film transistor. In addition, since the transparent organic layer blocks diffusion of the alkali ions, the semiconductor layer of the thin film transistor is not adversely effected by diffusion of the alkali ions from the soda lime glass material.

Figure 3A:
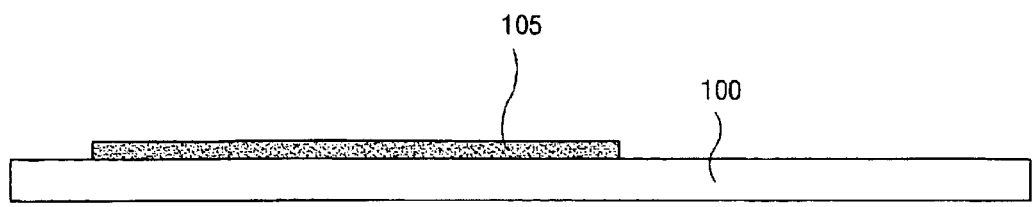
FIGS. 3A to 3C are cross sectional views of an exemplary method of fabricating an upper substrate of a liquid crystal display device according to the present invention.
Figure 3B:
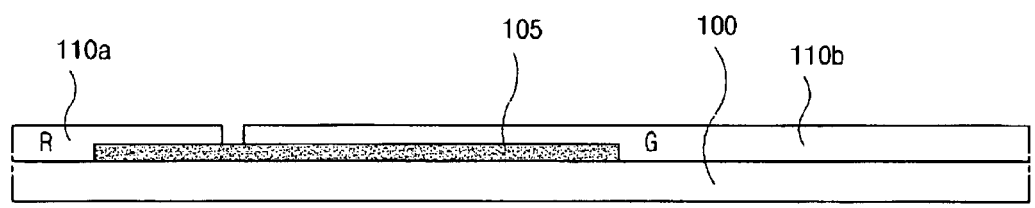
Figure 3C:
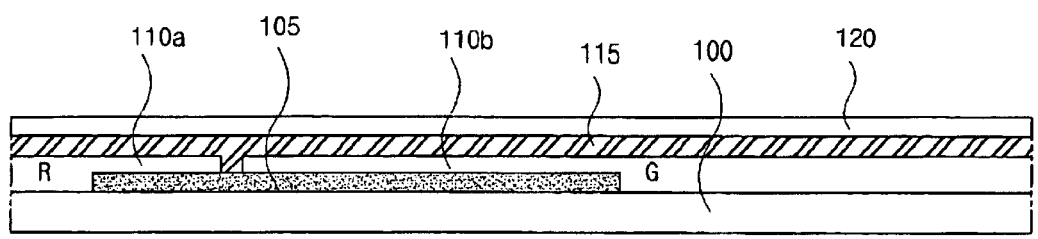

FIGS. 3A to 3C are cross sectional views of an exemplary method of fabricating an upper substrate of a liquid crystal display device according to the present invention. In FIG. 3A, an opaque metallic material, such as chromium (Cr) or chrome oxide ($CrO_X$), may be formed on an entire surface of a soda lime glass material 100 and patterned to form a black matrix 105.

In FIG. 3B, a red color resist may be spin-coated on an entire surface of the soda lime glass material 100 including the black matrix 105. Then, a proximity exposure may be performed on the coated red color resist for generating a photo-polymerization reaction. Next, the exposed red color resist may be developed to form a red color pattern 110a on the soda lime glass material 100. In addition, a green color pattern 110b and a blue color pattern (not shown) may be formed on the soda lime glass material 100, thereby forming a color filter layer that includes red, green, and blue color filter patterns. The red, green, and blue color resists may all be negative photoresist types so that non-exposed portions of the color resists may be removed during subsequent developing processes. In addition, an order of formation of the color filter layer may include different sequencing of the red, green and blue color patterns. This process is commonly referred to as a pigment dispersion method. However, an inkjet method, a thermal transferring method, a laser transferring method, and a film transferring method may be utilized to form the color filter layer.

In FIG. 3C, a silicon oxide ($SiO_2$) layer 115 may be formed over on entire surface of the soda lime glass material 100 to cover the color filter patterns 110 and the black matrix 105. The silicon oxide layer 115 may prevent diffusion of alkali ions from the soda lime glass material 100, and may be formed at a temperature of less than about 400° C. using at least a CVD (chemical vapor deposition) method, a sol-gel method, and an evaporation method. Next, a transparent conductive material, such as indium tin oxide or indium zinc oxide, may be formed on an entire surface of the silicon oxide layer 115, thereby forming a common electrode 120.

After fabricating the lower and upper substrates in FIGS. 2A to 2E and 3A to 3C, a cell process may be performed, wherein the lower substrate (in FIGS. 2A to 2E) is aligned and attached to the upper substrate (in FIGS. 3A to 3C) using a sealant material (not shown). Accordingly, the black matrix 105 is aligned to correspond to the thin film transistor, and the pixel electrode 95 faces the common electrode 120 to induce an electric field therebetween. Then, a liquid crystal material layer is disposed between the lower substrate (in FIGS. 2A to 2E) and the upper substrate (in FIGS. 3A to 3C).

Figure 4:
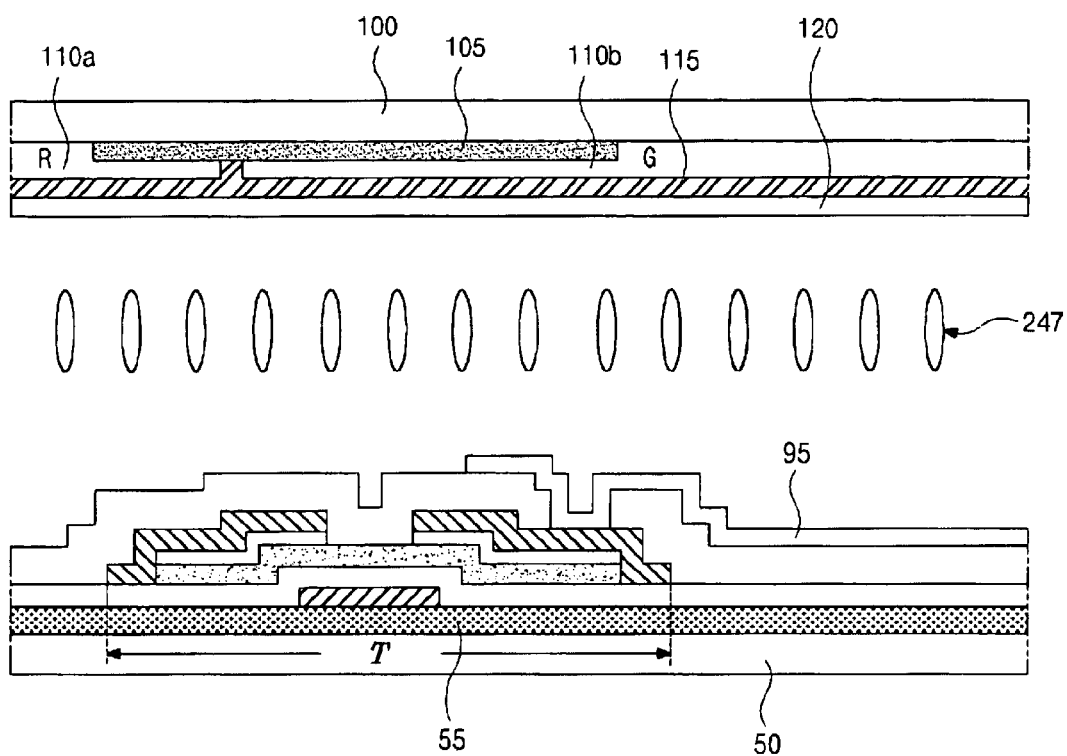
FIG. 4 is a cross sectional view of an exemplary liquid crystal display device according to the present invention.

FIG. 4 is a cross sectional view of an exemplary liquid crystal display device according to the present invention. In FIG. 4, an LCD device may include a lower substrate, which may be fabricated using the process of FIGS. 2A–2E, and an upper substrate, which may be fabricated using the process of FIGS. 3A–3C. The lower substrate may include a thin film transistor T and a transparent organic layer 55 formed on a soda lime glass material 50 to prevent diffusion of alkali ion from the soda lime glass material 50 into the thin film transistor T. The upper substrate may include a soda lime glass material 100, a black matrix 105 disposed on a rear surface of the soda lime glass material 100, and color filter patterns 110a and 110b disposed on the rear surface of the lime glass material 100 to cover the black matrix 105. Then, a silicon oxide layer 115 may be disposed on the color filter patterns 110a and 110b, and a common electrode 120 may be disposed on the silicon oxide layer 115. The silicon oxide layer 115 may prevent the diffusion of the alkali ions from the soda lime glass material 100 into a liquid crystal material layer 247. Since the thin film transistor T is not formed along the upper substrate, the silicon oxide layer 115 is sufficient to prevent diffusion of the alkali ions into the liquid crystal material layer 247. Moreover, the silicon oxide layer 115 may be formed at a temperature of less than about 400° C.

Figure 5:
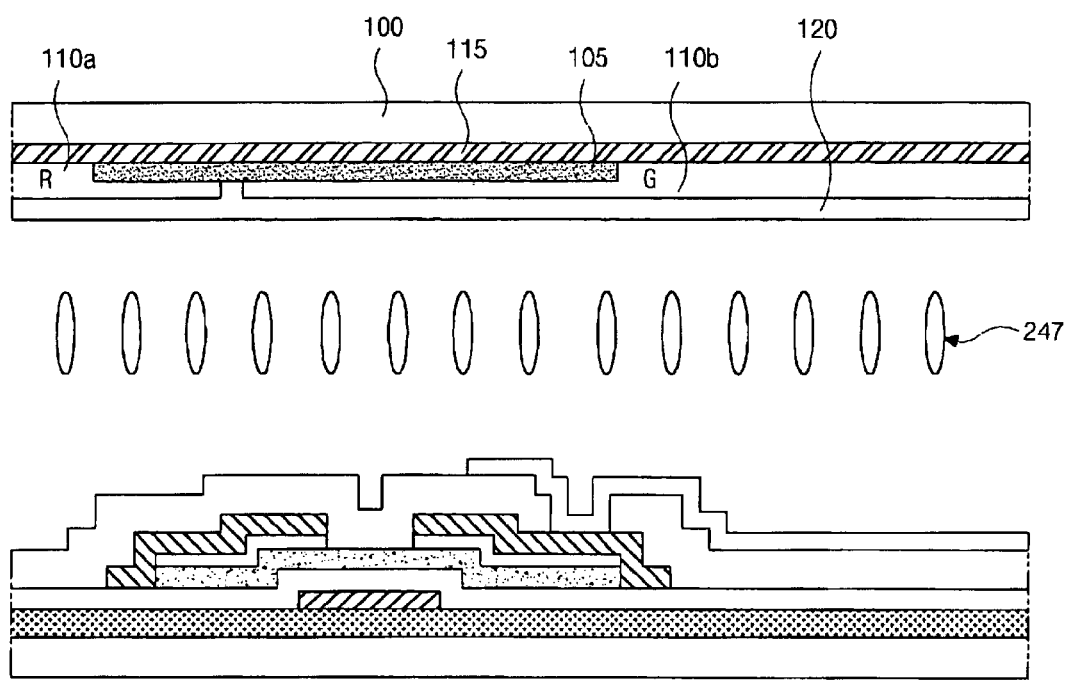
FIG. 5 is a cross sectional view of another exemplary liquid crystal display device according to the present invention.

FIG. 5 is a cross sectional view of another exemplary liquid crystal display device according to the present invention. In FIG. 5, an LCD device may include a lower substrate, which may be fabricated using the process of FIGS. 2A–2E, and an upper substrate, which may be fabricated using the process of FIGS. 3A–3C. The upper substrate may include a silicon oxide layer 115 formed on a rear surface of a soda lime glass material 100. Then, a black matrix 105 and color filter patterns 110a and 110b may be formed on the rear surface of the silicon oxide layer 115. Next, a common electrode 120 may be formed to cover the black matrix 105 and the color filter patterns 110.

In FIG. 5, the lower substrate may include elements similar to those shown in FIG. 4, such as a thin film transistor T and a transparent organic layer 55 formed on a soda lime glass material 50 to prevent diffusion of alkali ion from the soda lime glass material 50 into the thin film transistor T.

Figure 6:
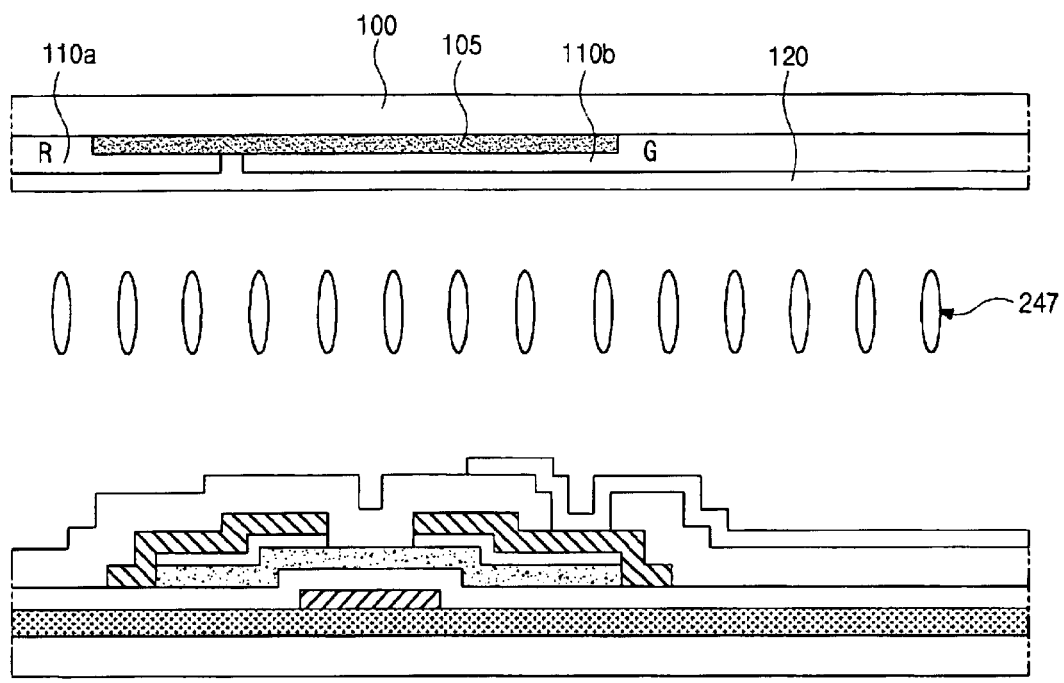
FIG. 6 is a cross sectional view of another exemplary liquid crystal display device according to the present invention.

FIG. 6 is a cross sectional view of another liquid crystal display device according to the present invention. In FIG. 6, an LCD device may include a lower substrate, which may be fabricated using the process of FIGS. 2A–2E, and an upper substrate, which may be fabricated using the process of FIGS. 3A–3C. The lower substrate may include elements similar to the lower substrate shown in FIGS. 4 and 5. However, the upper substrate may not include a silicon oxide layer on and over the soda lime glass material 100. For example, the upper substrate may include a black matrix 105, color filter patterns 110a and 110b, and a common electrode 120 sequentially formed on a rear surface of the soda lime glass material 100. Although the silicon oxide layer may not be provided on the upper substrate, the black matrix 105, the color filter patterns 110a and 110b, and the common electrode 120 may prevent diffusion of alkali ions from the soda lime glass material 100.

Figure 7:
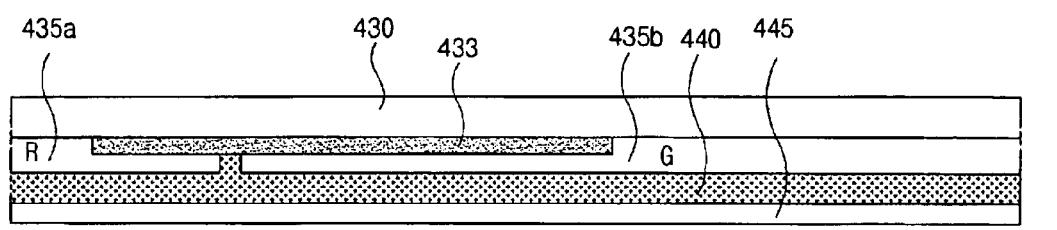
FIG. 7 is a cross sectional view of another exemplary liquid crystal display device according to the present invention.
Figure 7:
Figure 7:
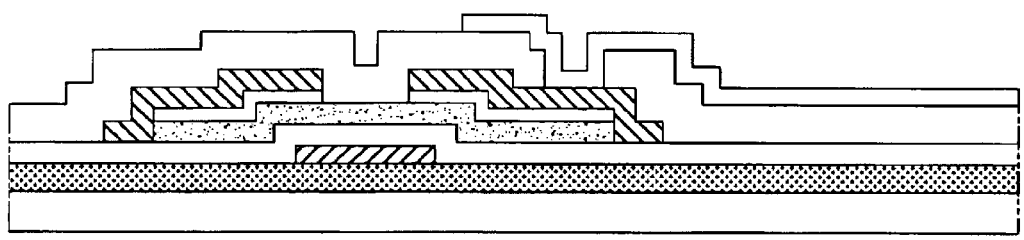

FIG. 7 is a cross sectional view of another exemplary liquid crystal display device according to the present invention. In FIG. 7, an LCD device may include a lower substrate, which may be fabricated using the process of FIGS. 2A–2E, and an upper substrate, which may be fabricated using the process of FIGS. 3A–3C.

In FIG. 7, a lower substrate may include element similar to those shown in FIGS. 4–6. However, instead of forming a silicon oxide layer on the upper substrate, a transparent organic layer may be disposed on the upper substrate to prevent diffusion of alkali ions from a soda lime material 430. Accordingly, since the lower substrate may be the same as the lower substrate shown in FIGS. 4–6, a detailed explanation about the lower substrate has been omitted.

In FIG. 7, an opaque metallic material, such as chromium (Cr) or a black resin, may be formed on an entire surface of a soda lime glass material 430, and patterned to form a black matrix 433. The black matrix 433 may be disposed to correspond to the thin film transistor formed on the lower substrate. Then, color filter patterns 435a and 435b may be formed on the soda lime glass material 430 to cover the black matrix 433 to include red (R), green (G), or blue (B) color filters. Next, a transparent organic insulator 440 may be disposed on a rear surface of the color filter patterns 435 to prevent diffusion of alkali ions from the soda lime glass material 430 into a liquid crystal material layer 447. The transparent organic insulator 440 may include acrylate, polyimide, polylefin, benzocyclobutene (BCB), poly oxaxol, cardo epoxy, cardo acrylate, and a combination thereof. Furthermore, the insulator 440 may include an inorganic material that has more than two of acrylate, polyimide, polylefin, benzocyclobutene (BCB), poly oxaxol, cardo epoxy, and cardo acrylate, or silane. Alternatively, the transparent organic insulator 440 may include hybrid co-polymers having more than one of acrylate, polyimide, polylefin, benzocyclobutene (BCB), poly oxaxol, cardo epoxy, and cardo acrylate, and other organic materials. A transparent conductive material, such as indium tin oxide or indium zinc oxide, may be disposed on a rear surface of the transparent organic insulator 440 to form a common electrode 445.

In FIG. 7, the upper substrate may be aligned with and attached to the lower substrate including a liquid crystal material layer 447 disposed therebetween. Although not shown, when attaching the upper and lower substrates, a sealant material may be disposed along peripheral portions of the upper and lower substrates.

Figure 8:
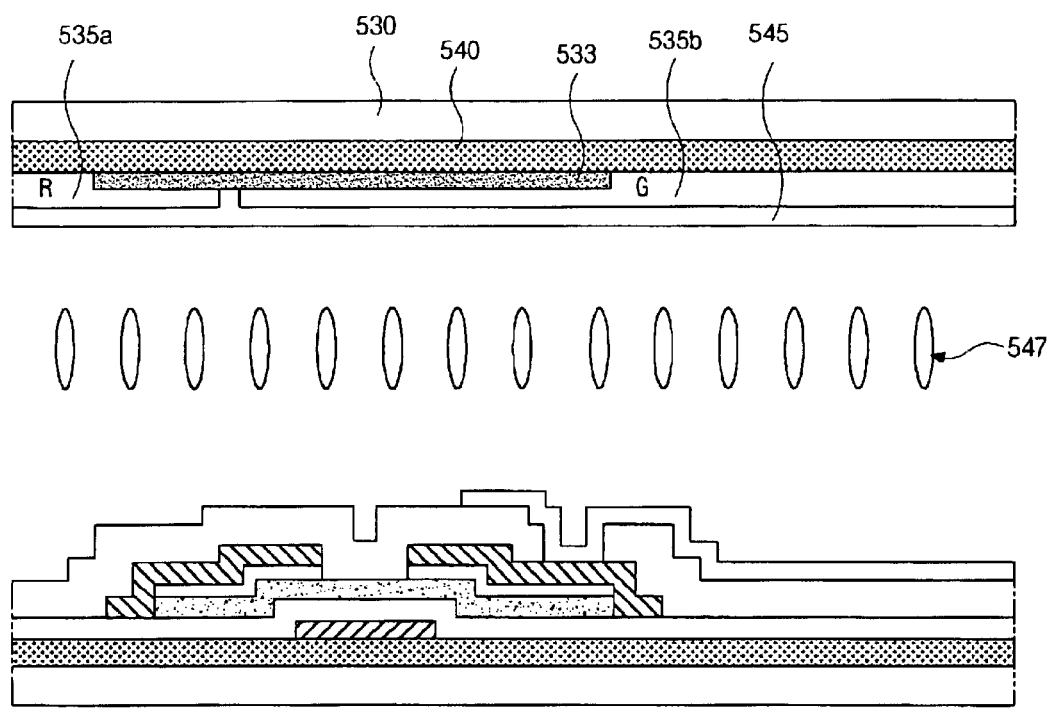
FIG. 8 is a cross sectional view of another exemplary liquid crystal display device according to the present invention.

FIG. 8 is a cross sectional view of another exemplary liquid crystal display device according to the present invention. In FIG. 8, a lower substrate may include elements similar to elements shown in FIGS. 4–7. Accordingly, a detailed explanation of the lower substrate has been omitted.

In FIG. 8, a transparent organic insulator 540 may be disposed on a rear surface of a soda lime glass material 530. Then, a black matrix 533 and color filter patterns 535a and 535b may be disposed on a rear surface of the transparent organic insulator 540. Then, a common electrode 545 of a transparent conductive material may be disposed to cover the color filter patterns 535a and 535b and the black matrix 533.

In FIGS. 7 and 8, the upper and lower substrates include soda lime glass materials, and the transparent organic insulators are located on and over the soda lime glass materials, to prevent diffusion of alkali ions from the soda lime glass materials.

Figure 9:
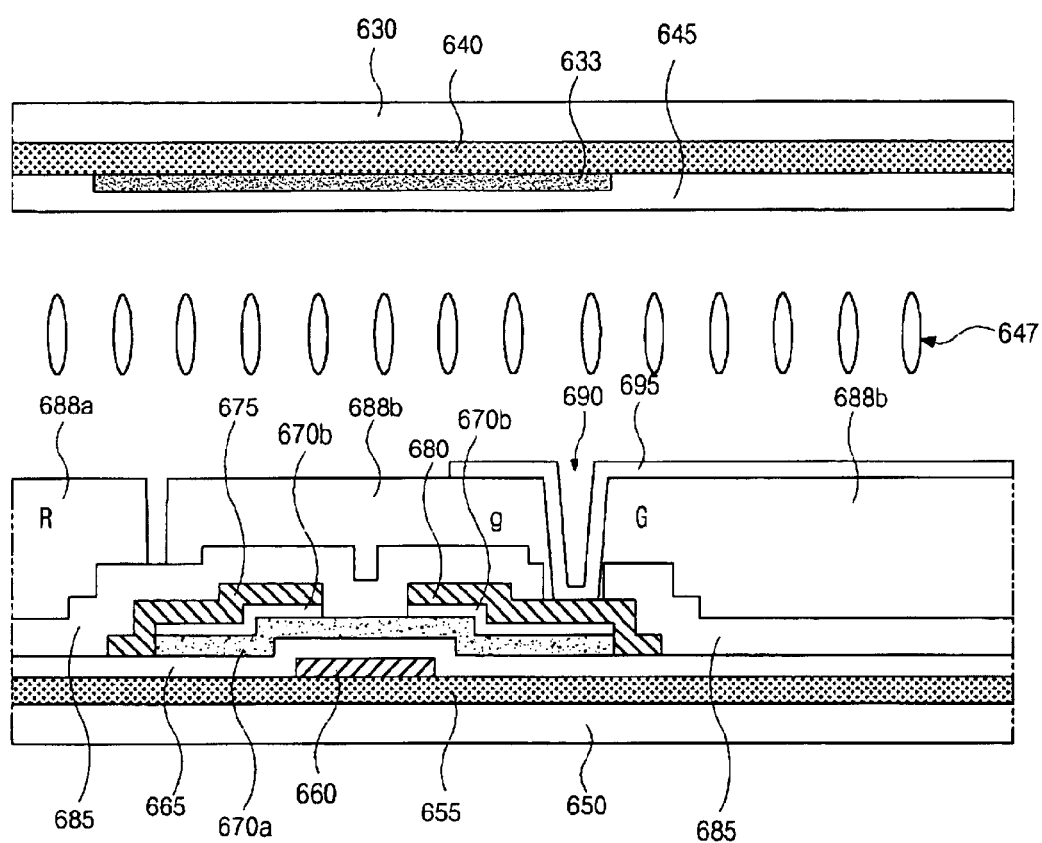
FIG. 9 is a cross sectional view of another exemplary liquid crystal display device according to the present invention.

FIG. 9 is a cross sectional view of another exemplary liquid crystal display device according to the present invention. In FIG. 9, an upper substrate does not include color filter patterns, but a lower substrate does include color filter patterns. Specifically, the liquid crystal display device may be referred to as a color-filter-on-thin-film-transistor (COT) structure.

When forming the upper substrate of FIG. 9, a transparent organic insulator 640 may be formed on a soda lime glass material 630, and may include an organic material selected from acrylate, polyimide, polylefin, benzocyclobutene (BCB), poly oxaxol, cardo epoxy, cardo acrylate, and combinations thereof. Furthermore, the transparent organic insulator 640 may be an inorganic material having more than two of acrylate, polyimide, polylefin, benzocyclobutene (BCB), poly oxaxol, cardo epoxy, and cardo acrylate, or silane. Alternatively, the transparent organic insulator 640 may be a hybrid co-polymer that includes more than one of acrylate, polyimide, polylefin, benzocyclobutene (BCB), poly oxaxol, cardo epoxy, and cardo acrylate, and other organic materials. After forming the transparent organic insulator 640, a black matrix 633 and a common electrode 645 may be sequentially formed on the transparent organic insulator 640. Accordingly, the black matrix 633 may be an opaque metallic material, such as chromium (Cr) or a black resin,. and the common electrode 645 may be a transparent conductive material, such as indium tin oxide or indium zinc oxide.

Next, the COT structure of the lower substrate may include a transparent organic insulator 655 formed on a soda lime glass material 650. The transparent organic insulator 655 may include material(s) similar to those used to form the transparent organic insulator 640. A gate electrode 660 may be formed on the transparent organic insulator 655 using conductive material, such as metal material(s). Then, a gate insulation layer 665 made of silicon oxide ($SiO_2$) or silicon nitride ($SiN_x$), for example, may be formed on the transparent organic insulator 655 to cover the gate electrode 660. An active layer 670a including intrinsic amorphous silicon and an ohmic contact layer 670b including doped amorphous silicon may be sequentially formed on the gate insulation layer 665 over the gate electrode 660, wherein the active layer 670a and the ohmic contact layer 670b may constitute a semiconductor layer 670. A source electrode 675 and a drain electrode 680, which may include metallic material(s), may be formed on the ohmic contact layer 670b, thereby forming a thin film transistor comprised of the gate electrode 660, the semiconductor layer 670, and the source and drain electrodes 675 and 680.

Then, a portion of the ohmic contact layer 670b between the source and drain electrodes 675 and 680 may be removed to expose a portion of the active layer 670a and to form an active channel thereon, and a passivation layer 685 may be formed over an entire surface of the soda lime glass material 650 to cover and protect the thin film transistor. The passivation layer 685 may include silicon nitride ($SiN_x$) or silicon oxide ($SiO_2$), for example. In addition, color filter patterns 688a and 688b each including red (R), green (G), or blue (B) color filters may be formed on the passivation layer 685, wherein each of the color filter patterns 688a and 688b may be disposed within a pixel region. The passivation layer 685 and the color filter patterns 688a and 688b may cover the thin film transistor to form a drain contact hole 690 that exposes a portion of the drain electrode 680. After forming the color filter patterns 688a and 688b, a transparent conductive material, such as indium tin oxide and indium zinc oxide, may be formed on an entire surface of the soda lime glass material 650, and patterned to form a pixel electrode 695. Accordingly, the pixel electrode 695 contacts the drain electrode 680 through the drain contact hole 690.

After forming the upper and lower substrates, the upper substrate may be aligned and attached to the lower substrate and a liquid crystal material layer 647 may be disposed between the attached upper and lower substrates. Accordingly, the lower substrate includes the color filter patterns so that diffusion of the alkali ions from the soda lime material into the liquid crystal material layer may be prevented.

Figure 10:
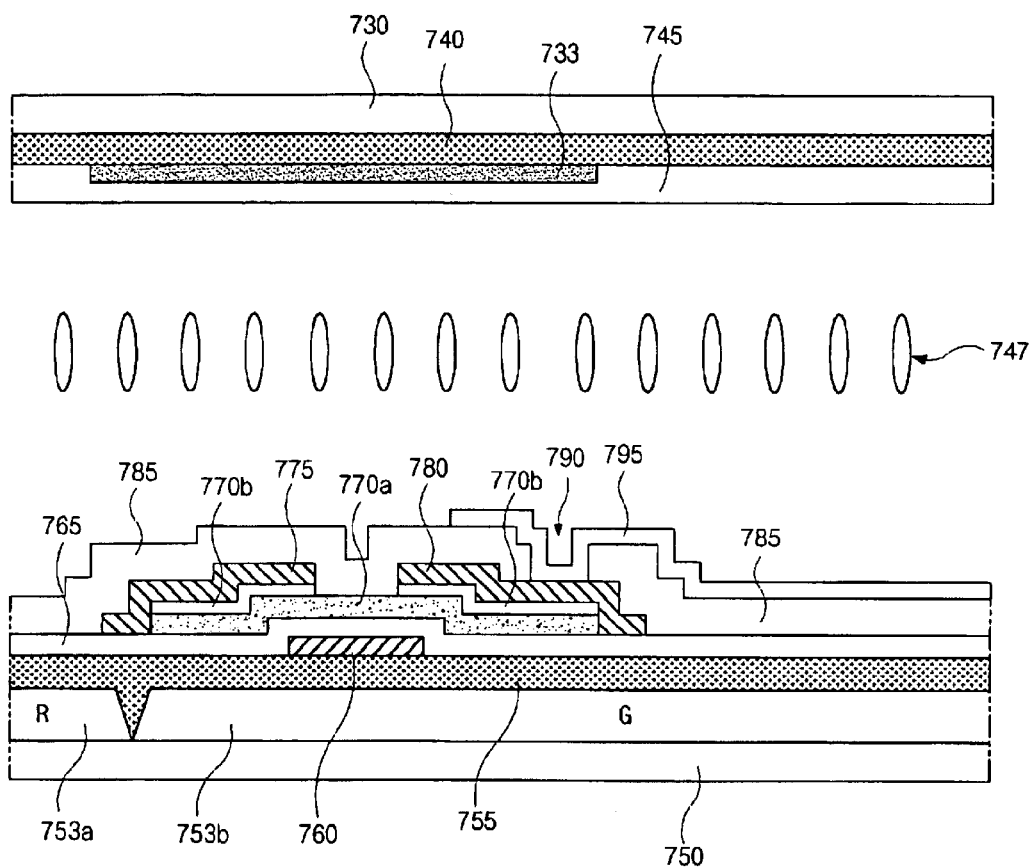
FIG. 10 is a cross sectional view of another exemplary liquid crystal display device according to the present invention.

FIG. 10 is a cross sectional view of another exemplary liquid crystal display device according to the present invention. In FIG. 10, an upper substrate may not include color filter patterns, but a lower substrate may include the color filter patterns. Thus, the liquid crystal display device according to the present invention may be referred to a thin-film-transistor-on-color-filter (TOC) structure.

The upper substrate of FIG. 10 may include a transparent organic insulator 740 formed on a soda lime glass material 730, and may include an organic material selected from acrylate, polyimide, polylefin, benzocyclobutene (BCB), poly oxaxol, cardo epoxy, cardo acrylate, and combinations thereof. Furthermore, the insulator 740 may include an inorganic material having more than two of acrylate, polyimide, polylefin, benzocyclobutene (BCB), poly oxaxol, cardo epoxy, and cardo acrylate, or silane. Alternatively, the transparent organic insulator 740 may include a hybrid co-polymer having more than one of acrylate, polyimide, polylefin, benzocyclobutene (BCB), poly oxaxol, cardo epoxy, and cardo acrylate, and other organic materials. After forming the transparent organic insulator 740, a black matrix 733 and a common electrode 745 may be sequentially formed on the transparent organic insulator 740. Accordingly, the black matrix 633 may include opaque metallic material(s), such as chromium (Cr) or a black resin, and the common electrode 745 may include transparent conductive material(s), such as indium tin oxide or indium zinc oxide.

The lower substrate having the TOC structure may include color filter patterns 753a and 753b each having red (R), green (G), or blue (B) color filters formed on a soda lime glass material 750. The color filter patterns 753a and 753b may be substantially spaced apart from each other and disposed within pixel regions. Then, a transparent organic insulator 755 may be formed on the color filter patterns 753a and 753b. The transparent organic insulator 755 may be made of materials similar to the transparent organic insulator 740. Accordingly, the transparent organic insulator 755 may function as a planarizing layer that flattens a surface of the soda lime glass material 750 having the color filter patterns 753. The transparent organic insulator 755 may also prevent diffusion of the alkali ions from the soda lime glass material 750. Then, a gate electrode 760 may be formed on the transparent organic insulator 755 using conductive material(s), such as metal(s). After forming the gate electrode 760, a gate insulation layer 765 of silicon oxide ($SiO_2$) or silicon nitride ($SiN_x$), for example, may be formed on the transparent organic insulator 755 to cover the gate electrode 760. An active layer 770a of intrinsic amorphous silicon and an ohmic contact layer 770b of doped amorphous silicon may be sequentially formed on the gate insulation layer 765 over the gate electrode 760. The active layer 770a and the ohmic contact layer 770b may constitute a semiconductor layer 770. Then, a source electrode 775 and a drain electrode 780, which are metallic material(s), may be formed on the ohmic contact layer 770b, thereby forming a thin film transistor comprised of the gate electrode 760, the semiconductor layer 770, and the source and drain electrodes 775 and 780.

Then, a portion of the ohmic contact layer 770b between the source and drain electrodes 775 and 780 may removed to expose a portion of the active layer 770a to form an active channel. After forming the thin film transistor, a passivation layer 785 may be formed over an entire surface of the soda lime glass material 750 to cover and protect the thin film transistor. The passivation layer 785 may include silicon nitride ($SiN_x$) or silicon oxide ($SiO_2$), for example, and may be patterned to form a drain contact hole 790 that exposes a portion of the drain electrode 780. Then, transparent conductive material(s), such as indium tin oxide and indium zinc oxide, may be formed over the soda lime glass material 750, and patterned to form a pixel electrode 795. Accordingly, the pixel electrode 795 contacts the drain electrode 780 through the drain contact hole 790.

After forming the upper and lower substrate, the upper substrate may be aligned with and attached to the lower substrate, and a liquid crystal material layer 747 may be disposed between the attached upper and lower substrates. The lower substrate may include the color filter patterns 753a and 753b and the transparent organic insulator 755 disposed between the soda lime glass material 750 and the thin film transistor so that the thin film transistor may be safely protected from diffusion of alkali ions from the soda lime glass material 750.

It will be apparent to those skilled in the art that various modifications and variations can be made in the liquid crystal display device having soda-lime glass and method of fabricating a liquid crystal display device having soda-lime glass of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   an upper substrate including a first soda lime glass material, an ion blocking layer on the first soda lime glass material, a color filter layer, and a common electrode;
   a lower substrate including a second soda lime glass material, a transparent organic insulator on the second soda lime glass material, and a thin film transistor on the transparent organic insulator; and
   a liquid crystal material layer interposed between the upper substrate and the lower substrate.

2. The device according to claim 1, wherein the ion blocking layer includes a silicon oxide layer.

3. The device according to claim 2, wherein the silicon oxide layer is formed at a temperature of less than about 400° C.

4. The device according to claim 1, wherein the ion blocking layer and the transparent organic insulator include the same materials.

5. The device according to claim 4, wherein the transparent organic insulator includes a material selected from a group consisting of acrylate, polyimide, polylefin, benzocyclobutene (BCB), poly oxaxol, cardo epoxy, cardo acrylate, and combinations thereof.

6. The device according to claim 4, wherein the transparent organic insulator is an inorganic material that includes silane.

7. The device according to claim 4, wherein the transparent organic insulator includes an inorganic material that includes two of acrylate, polyimide, polylefin, benzocyclobutene (BCB), poly oxaxol, cardo epoxy, and cardo acrylate.

8. The device according to claim 4, wherein the transparent organic insulator is a hybrid co-polymer that includes more than one of acrylate, polyimide, polylefin, benzocyclobutene (BCB), poly oxaxol, cardo epoxy, and cardo acrylate.

9. The device according to claim 1, wherein the upper substrate further includes a black matrix.

10. The device according to claim 9, wherein the black matrix is disposed on a rear surface of the first soda lime glass material, the color filter layer is disposed on a rear surface of the first soda lime glass to cover the black matrix, the ion blocking layer is disposed on a rear surface of the color filter layer, and the common electrode is disposed on a rear surface of the ion blocking layer.

11. The device according to claim 9, wherein the ion blocking layer is disposed on a rear surface of the first soda lime glass material, the black matrix is disposed on a rear surface of the ion blocking layer, the color filter layer is disposed on a rear surface of the ion blocking layer to cover the black matrix, and the common electrode is disposed on a rear surface of the color filter layer.

12. The device according to claim 1, wherein the first and second soda lime glass materials both have more than 1 wt % content of $Na_2O$.

13. A liquid crystal display device, comprising:
    an upper substrate including a first soda lime glass material, a first transparent organic insulator, and a common electrode;
    a lower substrate including a second soda lime glass material, a second transparent organic insulator, a color filter layer, and a thin film transistor; and
    a liquid crystal material layer between the upper substrate and the lower substrate.

14. The device according to claim 13, wherein the first and second transparent organic insulators are a material selected from a group consisting of acrylate, polyimide, polylefin, benzocyclobutene (BCB), poly oxaxol, cardo epoxy, cardo acrylate, and combinations thereof.

15. The device according to claim 13, wherein the first and second transparent organic insulators are an inorganic material that includes silane.

16. The device according to claim 13, wherein the first and second transparent organic insulators are an inorganic material that includes two of acrylate, polyimide, polylefin, benzocyclobutene (BCB), poly oxaxol, cardo epoxy, and cardo acrylate.

17. The device according to claim 13, wherein first and second transparent organic insulators are a hybrid co-polymer that includes more than one of acrylate, polyimide, polylefin, benzocyclobutene (BCB), poly oxaxol, cardo epoxy, and cardo acrylate.

18. The device according to claim 13, wherein the upper substrate further includes a black matrix.

19. The device according to claim 18, wherein the first transparent organic insulator is disposed on a rear surface of the first soda lime glass material, the black matrix is disposed on a rear surface of the first transparent organic insulator, and the common electrode is disposed on a rear surface of the first transparent organic insulator to cover the black matrix.

20. The device according to claim 13, wherein the second transparent insulator is disposed on the second soda lime glass material, the thin film transistor is disposed on the second transparent organic insulator, and the color filer layer is disposed over the thin film transistor.

21. The device according to claim 13, wherein the color filter layer is disposed on the second soda lime glass material, the second transparent organic insulator is disposed on the color filter layer, and the thin film transistor is disposed on the second transparent organic insulator.

22. A method of forming a liquid crystal display device, comprising:

forming an upper substrate to include a first soda lime glass material, a black matrix, an ion blocking layer, a color filter layer, and a common electrode;

forming a lower substrate including a second soda lime glass material, a transparent organic insulator on the soda lime glass, and a thin film transistor on the transparent organic insulator;

attaching the upper substrate to the lower substrate such that the common electrode faces the thin film transistor; and forming a liquid crystal material layer between the upper substrate and the lower substrate.

23. The method according to claim 22, wherein the ion blocking layer is a silicon oxide layer.

24. The method according to claim 23, wherein the silicon oxide layer is formed at a temperature of less than about 400° C.

25. The method according to claim 22, wherein the ion blocking layer and the transparent organic insulator are formed of the same materials.

26. The method according to claim 25, wherein the transparent organic insulator includes a material selected from a group consisting of acrylate, polyimide, polylefin, benzocyclobutene (BCB), poly oxaxol, cardo epoxy, cardo acrylate, and combinations thereof.

27. The method according to claim 25, wherein the transparent organic insulator is an inorganic material that includes silane.

28. The method according to claim 25, wherein the transparent organic insulator includes an inorganic material that includes two of acrylate, polyimide, polylefin, benzocyclobutene (BCB), poly oxaxol, cardo epoxy, and cardo acrylate.

29. The method according to claim 25, wherein the transparent organic insulator is a hybrid co-polymer that includes more than one of acrylate, polyimide, polylefin, benzocyclobutene (BCB), poly oxaxol, cardo epoxy, and cardo acrylate.

30. The method according to claim 22, wherein forming the upper substrate comprises:

forming the black matrix on a rear surface of the first soda lime glass material;

forming the color filter layer on a rear surface of the first soda lime glass material to cover the black matrix;

forming the ion blocking layer on a rear surface of the color filter layer; and forming the common electrode on a rear surface of the ion blocking layer.

31. The method according to claim 22, wherein forming the upper substrate comprises:

forming the ion blocking layer on a rear surface of the first soda lime glass material;

forming the black matrix on a rear surface of the ion blocking layer;

forming the color filter layer on a rear surface of the ion blocking layer to cover the black matrix; and forming the common electrode on a rear surface of the color filter layer.

32. The method according to claim 22, wherein the first and second soda lime glass materials each have more than 1 wt % content of $Na_2O$.

33. A method of forming a liquid crystal display device, comprising:

forming an upper substrate to include a first soda lime glass material, a first transparent organic insulator, a black matrix, and a common electrode;

forming a lower substrate to include a second soda lime glass material, a second transparent organic insulator, a color filter layer, and a thin film transistor;

attaching the upper substrate to the lower substrate such that the common electrode faces the thin film transistor; and forming a liquid crystal material layer between the upper substrate and the lower substrate.

34. The method according to claim 33, wherein the first and second transparent organic insulators include a material selected from a group consisting of acrylate, polyimide, polylefin, benzocyclobutene (BCB), poly oxaxol, cardo epoxy, cardo acrylate, and combinations thereof.

35. The method according to claim 33, wherein the first and second transparent organic insulators are an inorganic material that includes silane.

36. The method according to claim 33, wherein the first and second transparent organic insulators have an inorganic material that includes two of acrylate, polyimide, polylefin, benzocyclobutene (BCB), poly oxaxol, cardo epoxy, and cardo acrylate.

37. The method according to claim 33, wherein first and second transparent organic insulators are a hybrid co-polymer that includes more than one of acrylate, polyimide, polylefin, benzocyclobutene (BCB), poly oxaxol, cardo epoxy, and cardo acrylate.

38. The method according to claim 33, wherein forming the upper substrate comprises:

forming the first transparent organic insulator on a rear surface of the first soda lime glass material;

forming the black matrix on a rear surface of the first transparent organic insulator; and forming the common electrode on a rear surface of the first transparent organic insulator to cover the black matrix.

39. The method according to claim 33, wherein forming the lower substrate comprises:

forming the second transparent insulator on the second soda lime glass material;

forming the thin film transistor on the second transparent organic insulator; and forming the color filer layer over the thin film transistor.

40. The method according to claim 33, wherein forming the lower substrate comprises:

forming the color filter layer on the second soda lime glass material;

forming the second transparent organic insulator on the color filter layer; and forming the thin film transistor on the second transparent organic insulator.

* * * * *